United States Patent
Perrier et al.

(10) Patent No.: US 12,115,639 B2
(45) Date of Patent: Oct. 15, 2024

(54) DRILLING TOOL AND USE IN A SCREW-DRIVING OPERATION

(71) Applicant: ILLINOIS TOOL WORKS INC., Glenview, IL (US)

(72) Inventors: Matthieu Perrier, Valence (FR); Ludovic Tournier, Saint-Marcellin (FR)

(73) Assignee: Illinois Tool Works Inc., Glenview, IL (US)

( * ) Notice: Subject to any disclaimer, the term of this patent is extended or adjusted under 35 U.S.C. 154(b) by 311 days.

(21) Appl. No.: 16/639,694

(22) PCT Filed: Aug. 17, 2018

(86) PCT No.: PCT/US2018/046857
§ 371 (c)(1),
(2) Date: Feb. 17, 2020

(87) PCT Pub. No.: WO2019/040336
PCT Pub. Date: Feb. 28, 2019

(65) Prior Publication Data
US 2020/0262045 A1 Aug. 20, 2020

(30) Foreign Application Priority Data

Aug. 22, 2017 (FR) ...................................... 1757781

(51) Int. Cl.
*B25D 16/00* (2006.01)
*B23B 51/08* (2006.01)
(Continued)

(52) U.S. Cl.
CPC ................ *B25F 3/00* (2013.01); *B23B 51/08* (2013.01); *B25B 21/007* (2013.01);
(Continued)

(58) Field of Classification Search
CPC ..... B25B 21/007; B25B 51/08; B25D 16/006; B25D 17/005; B25D 17/008; B25D 2216/0084; B25D 2217/0042
(Continued)

(56) References Cited

U.S. PATENT DOCUMENTS 3,336,611 A * 8/1967 Schepp ................. B25B 21/007
408/202
3,484,114 A * 12/1969 Rodin ................... B25B 21/007
81/436

(Continued)

FOREIGN PATENT DOCUMENTS

DE 202010011308 12/2010
DE 202010011308 U1 12/2010
(Continued)

OTHER PUBLICATIONS

"International Search Report and Written Opinion", PCT/US2018/046857 (10 pages), Nov. 16, 2018.
(Continued)

*Primary Examiner* — Thomas M Wittenschlaeger
*Assistant Examiner* — David G Shutty
(74) *Attorney, Agent, or Firm* — Neal, Gerber & Eisenberg LLP

(57) ABSTRACT

A drilling tool configured to operate in two drilling modes, respectively with and without hammer action, said tool comprising a front end equipped with a rotating part for mounting a drill bit by way of an SDS-type push-fitting, characterized in that said rotating part comprises a mechanism for the removable attachment to a first longitudinal end of a tubular extension, this tubular extension being configured to extend along and around a drill bit mounted in the rotating part and comprising a second longitudinal end configured to bear at least one screw-driving element, such (Continued)

that the tool can be used for a screw-driving operation even when it is equipped with the drill bit.

12 Claims, 3 Drawing Sheets

(51) Int. Cl.
  B25B 21/00 (2006.01)
  B25B 21/02 (2006.01)
  B25D 11/00 (2006.01)
  B25D 11/06 (2006.01)
  B25D 17/00 (2006.01)
  B25D 17/08 (2006.01)
  B25D 17/24 (2006.01)
  B25F 3/00 (2006.01)

(52) U.S. Cl.
  CPC .......... *B25B 21/026* (2013.01); *B25D 16/006* (2013.01); *B25D 17/005* (2013.01); *B25D 17/088* (2013.01); *B25D 2216/0084* (2013.01); *B25D 2217/0042* (2013.01)

(58) Field of Classification Search
  USPC .......................................................... 81/464
  See application file for complete search history.

(56) References Cited

U.S. PATENT DOCUMENTS

| | | | | |
|---|---|---|---|---|
| 3,932,904 | A * | 1/1976 | Nilsson | B25F 3/00 7/165 |
| 3,965,510 | A * | 6/1976 | Ernst | B25B 21/007 7/165 |
| 4,007,795 | A * | 2/1977 | Gawron | B25B 21/007 175/414 |
| 4,107,800 | A | 8/1978 | Jorgensen | |
| 4,107,949 | A * | 8/1978 | Wanner | B25D 17/088 464/167 |
| 4,191,227 | A | 3/1980 | Venter | |
| 4,218,794 | A * | 8/1980 | Seidel | B25F 3/00 7/138 |
| 4,218,795 | A * | 8/1980 | Ernst | B25B 21/007 7/158 |
| 4,296,656 | A | 10/1981 | Ernst | |
| 4,468,826 | A * | 9/1984 | Moores, Jr. | B25B 21/007 81/464 |
| 4,551,875 | A * | 11/1985 | Getz | B25B 21/007 81/437 |
| 4,588,335 | A | 5/1986 | Pearson, Jr. | |
| 4,617,844 | A | 10/1986 | Batten | |
| 4,791,690 | A * | 12/1988 | Kuang-Wu | B25F 3/00 81/437 |
| 4,796,319 | A * | 1/1989 | Taft | B25B 21/007 7/165 |
| 4,810,139 | A | 3/1989 | Regan | |
| 4,818,157 | A | 4/1989 | Kouvelis | |
| 4,954,025 | A * | 9/1990 | Crawford | B25F 3/00 408/239 R |
| 5,110,145 | A * | 5/1992 | Stewart | B23B 45/003 7/165 |
| 5,168,781 | A | 12/1992 | Tenuta | |
| 5,191,666 | A * | 3/1993 | Corbin | B25B 21/007 7/165 |
| 5,313,680 | A * | 5/1994 | Ringler | B25B 21/007 7/138 |
| 5,409,333 | A * | 4/1995 | Hu | B25F 3/00 7/165 |
| 5,490,683 | A | 2/1996 | Mickel et al. | |
| 5,586,847 | A | 12/1996 | Mattern, Jr. et al. | |
| 5,651,647 | A * | 7/1997 | Ray | B25B 21/007 81/439 |
| 5,711,043 | A * | 1/1998 | Crawford | E21B 17/02 7/165 |
| 5,782,570 | A | 7/1998 | Masterson et al. | |
| 5,810,367 | A | 9/1998 | Holzer, Jr. et al. | |
| 5,829,929 | A | 11/1998 | Lewis | |
| 5,897,121 | A | 4/1999 | Case | |
| 5,908,076 | A | 6/1999 | Marcengill et al. | |
| 5,913,509 | A | 6/1999 | Price et al. | |
| 6,223,375 | B1 * | 5/2001 | Vaughan, Jr. | B25B 23/0035 7/138 |
| 6,321,855 | B1 * | 11/2001 | Barnes | B25B 13/06 279/157 |
| 6,557,648 | B2 * | 5/2003 | Ichijyou | B25D 16/006 173/48 |
| 6,623,220 | B2 * | 9/2003 | Nuss | B23B 51/0426 279/75 |
| 7,104,738 | B2 * | 9/2006 | Cantlon | B23B 51/0473 408/239 R |
| 7,147,409 | B2 | 12/2006 | Weinhold | |
| 7,174,969 | B2 * | 2/2007 | Droste | B25D 16/006 173/48 |
| 7,314,097 | B2 * | 1/2008 | Jenner | B25D 16/006 475/265 |
| 7,354,230 | B2 * | 4/2008 | Bauman | B25B 21/007 403/379.5 |
| 7,717,192 | B2 * | 5/2010 | Schroeder | B25D 16/006 173/217 |
| 8,057,136 | B2 * | 11/2011 | Chiang | B25B 23/12 279/82 |
| 8,061,000 | B2 * | 11/2011 | Santamarina | B25B 31/00 81/463 |
| 8,602,285 | B2 * | 12/2013 | Santamarina | B25D 17/005 81/463 |
| 8,622,667 | B1 * | 1/2014 | Seay | B25B 21/007 279/140 |
| 9,108,312 | B2 * | 8/2015 | Elger | B25F 5/001 |
| 9,339,924 | B2 * | 5/2016 | Friedrich | B25D 17/06 |
| 9,364,903 | B2 * | 6/2016 | Hall | B25B 21/007 |
| 9,623,545 | B2 * | 4/2017 | Mergener | B25D 17/00 |
| 9,744,658 | B2 * | 8/2017 | Simeone | B25B 21/00 |
| 2007/0074350 | A1 * | 4/2007 | Dreps | B25B 21/007 7/138 |
| 2007/0160435 | A1 * | 7/2007 | Chao | B23B 31/1071 408/102 |
| 2008/0056836 | A1 * | 3/2008 | Shiao | B23B 51/108 408/191 |
| 2010/0326686 | A1 * | 12/2010 | Leong | B25B 21/026 173/48 |
| 2013/0021783 | A1 * | 1/2013 | Vanko | B25B 21/00 362/119 |
| 2013/0221058 | A1 * | 8/2013 | Neitzell | B25D 17/02 227/147 |
| 2014/0028226 | A1 * | 1/2014 | Mergener | B25F 5/00 318/400.09 |
| 2014/0131059 | A1 * | 5/2014 | Verbrugge | B25F 5/00 173/217 |
| 2015/0101177 | A1 | 4/2015 | Hall | |
| 2016/0250738 | A1 * | 9/2016 | Leh | B25B 23/1475 173/176 |
| 2016/0354888 | A1 * | 12/2016 | Huber | B25F 5/001 |
| 2017/0173766 | A1 * | 6/2017 | Dill | B23B 51/12 |
| 2017/0217000 | A1 * | 8/2017 | Dierickx | B25B 23/141 |
| 2017/0217005 | A1 * | 8/2017 | Mohanasundaram | B25D 17/088 |
| 2018/0238367 | A1 * | 8/2018 | Laue | B25B 21/007 |
| 2020/0262045 | A1 * | 8/2020 | Perrier | B25D 16/006 |

FOREIGN PATENT DOCUMENTS

| | | | | |
|---|---|---|---|---|
| EP | | 1078718 | 2/2001 | |
| EP | | 2345496 A1 * | 7/2011 | ............. B23B 51/08 |

OTHER PUBLICATIONS

"Search Report and Written Opinion", Corresponding French Application No. 1757781 (7 pages), May 4, 2018.

Canadian Office Action for Canadian Application No. 3,004,892, dated Dec. 27, 2018 (3 pages).

(56) References Cited

OTHER PUBLICATIONS

International Preliminary Report on Patentability for International Application No. PCT/US2016/064677, mailed Jun. 28, 2018 (9 pages).
European Patent Office as International Searching Authority, International Search Report and Written Opinion for corresponding PCT Application No. PCT/US2016/064677 mailed Feb. 23, 2017.
Snappy Drilling Accessories, available at http://www.ttrackusa.com/snappy_drill_bitts.htm, printed Dec. 1, 2016 (5pages).
Drill bit adapter image, retrieved from Google prior to Dec. 1, 2016 (1 page).

* cited by examiner

DRILLING TOOL AND USE IN A SCREW-DRIVING OPERATION

PRIORITY

This application is a national stage application of PCT/US2018/046857, filed on Aug. 17, 2018, which claims priority to and the benefit of French Application No. 1757781, filed Aug. 22, 2017 the entire contents of which are incorporated herein by reference.

TECHNICAL FIELD

The present disclosure relates in particular to a drilling tool and to the use of same in a screw-driving operation.

PRIOR ART

A drilling tool is a tool that allows a hole to be drilled in a wall by way of a drill bit. Conventionally, such a tool is portable and comprises a handle for manipulating the tool and a front end for the attachment of the drill bit, the outside diameter of the drill bit being dependent on the desired diameter of drilling.

There are various types of drill bit and drill bit attachment mechanism. For example, drill bits comprising a drilling portion cut into a helix and a cylindrical portion for attachment to the front end of the tool, which comprises jaws for clamping this cylindrical portion, are known. This type of drill bit and tool is generally reserved for a mode of drilling without hammer action, the rotation of the drill bit about its axis alone being used to drill a hole.

Hammer action drill bits and drilling tools are also known. The portion for attaching the drill bit to the front end of the tool is then of SDS (such as an SDS+, SDSmax, etc.) type well known to those skilled in the art, which allows the drill bit to be both rotated about its axis and imparted a succession of translational movements along its axis, which give rise to impacts into the wall and make it easier to create the hole, particularly in a wall made of hard material such as concrete.

It is known practice to use a drilling tool to screw a fastener such as a screw. To do that, all that is required is for the drill bit to be removed from the jaws of a tool for example and replaced by an adapter which is clamped by the jaws of this tool, in place of the drill bit, and which carries a screw-driving fitting designed to drive the fastener. However, in the case of a hammer action drilling tool, or a drilling tool designed to operate in a drilling mode with a hammer action, this is not currently possible or becomes difficult because of the SDS type of connection used in the aforementioned drill bits.

U.S. Pat. No. 4,468,826 describes a hammer drilling tool which is not equipped with a connection of SDS type. Moreover, even though the tool is able to be fitted with an accessory around the drill bit, this tool is not configured to adapt operating parameters according to the equipment (drill bit or accessory) used.

U.S. Pat. No. 5,409,333 describes a drilling tool which is not fitted with an SDS type connection and which is not configured to transmit a hammer action.

The present disclosure seeks to improve on the current technology in a way that is simple, effective and economical.

BRIEF SUMMARY

The present disclosure thus proposes a drilling tool, configured to operate in two drilling modes, respectively with and without hammer action. In various embodiments, the tool comprises a front end equipped with a rotating part for mounting a drill bit by way of an SDS-type push-fitting, characterized in that the rotating part comprises an extension connection mechanism for removable attachment to a first longitudinal end of a tubular extension, this tubular extension being configured to extend along and around a drill bit mounted in the rotating part and including a second longitudinal end configured to bear a screw-driving element, such that the tool can be used for a screw-driving operation even when it is equipped with the drill bit.

It will thus be appreciated that the extension can be mounted on the tool that can remain fitted with a drill bit. There is therefore no need to remove the drill bit or even to fit a new front end on the tool in order to be able to attach the extension to it. This makes it possible to significantly simplify the use of the tool for a screw-driving operation, only the extension having to be handled in order to switch from a drilling operation to a screw-driving operation, and vice versa. This mode can be used to perform this screw-driving operation.

The tool according to the present disclosure may comprise one or more of the following features, considered in isolation from one another or in combination with one another:
  said first end has a polygonal shape in cross section;
  said extension connection mechanism is configured to engage with said first end by way of a male-female push-fitting;
  said extension comprising a tubular body configured to extend around part of the drill bit and around said first end;
  said body has a ball retention system configured to retain said first end once connected, said ball retention system comprising at least one ball that is borne by said body and is configured to cooperate by engagement with at least one recess provided on said first end;
  said body comprises an internal annular groove for receiving a first O-ring seal configured to engage with said drill bit;
  said front end comprises a second O-ring mounted between said body and SDS-type push-fitting mechanism for the drill bit;
  the tool comprises a first, mode, selector for selecting between said drilling modes with and without hammer action, and a second, speed, selector for selecting between a first speed, suitable for hammer drilling with a high impact force and fast screw driving, and a second, lower, speed, suitable for slow, high-torque screw driving and hammer drilling with a lower impact force;
  the tool comprises a brushless motor for driving the rotation of said rotating part, this motor being connected by a microcontroller to said first and second selectors and to a trigger for actuating the tool; and
  said rotating part is able not to transmit hammer actions to said extension.

The present disclosure also relates to a tubular extension for a tool as described hereinabove, said extension having an elongate shape and comprising a first longitudinal end for removable attachment to said extension connection mechanism of the front end of the tool, and a second longitudinal end configured to bear at least one screw-driving bit, the extension comprising a longitudinal internal bore which is open at said first end and of which the length and the external diameter are configured such that the extension can be mounted on the tool even when the latter is equipped with a drill bit.

The extension according to the present disclosure may comprise one or more of the following features, considered in isolation from one another or in combination with one another:
- said bore comprises at least two cylindrical portions of different diameters, including a first portion of larger diameter located toward said first end;
- said second end is configured to receive at least one element affixed by male or female push-fitting, or even two elements affixed by male and female push-fitting, respectively; and
- said second end has a polygonal shape in cross section.

The present disclosure also relates to an assembly comprising a tool and at least one extension both as described in the foregoing.

The present disclosure also relates to a method for using a tool as described hereinabove, for a screw-driving operation, the method comprising a step consisting in possibly retaining a drill bit on the front end of the tool and affixing, to this front end, an extension as described hereinabove.

BRIEF DESCRIPTION OF THE FIGURES

The present disclosure will be better understood and further details, features and advantages thereof will become more clearly apparent from reading the following description, given by way of non-limiting example and made with reference to the attached drawings in which.

DETAILED DESCRIPTION

Figure 1:
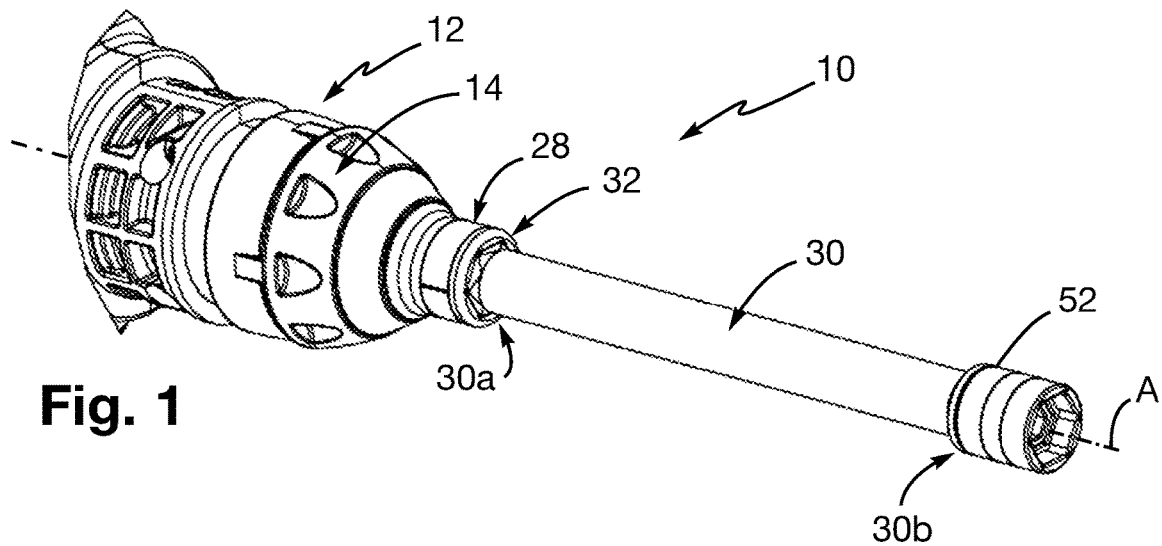
FIG. 1 is a schematic perspective view of a drilling tool equipped with a tubular extension according to the present disclosure, the drilling tool being depicted in part.

FIGS. 1 to 5 depict a first embodiment of a drilling tool 10 according to the present disclosure, this tool being depicted in part.

Conventionally, such a tool 10 is portable and therefore comprises a handle for a user to hold and a front end 12 for mounting a drill bit, only the front end 12 of the tool being visible in the drawings.

This tool 10 is able to operate in two drilling modes, respectively with and without hammer action. For that, the tool 10 is equipped with a first selector (not depicted) for selecting the mode of operation from these two drilling modes.

This first selector is situated on a housing of the tool and is accessible to the user. It may come in the form of a rotary knob that the user can move between two positions, for example spaced 180° apart, a first position for selecting the mode of drilling without hammer action, in which an arrow on the knob points for example toward a first drawing provided on the housing and depicting for example a drill bit, and a second position for selecting the mode of drilling with hammer action, in which the arrow on the knob points toward another drawing provided on the housing and depicting for example a hammer.

The front end 12 of the tool is configured to accept a drill bit via an SDS-type push-fit, which may be SDS+, SDSmax or the like. Naturally, a drill bit is chosen according to its drilling diameter, namely to the diameter of its drilling portion 18b. The diameter of its SDS attachment portion 18a however, is standard.

In the description which follows, expressions such as "axial", "radial", "longitudinal", etc. refer to the axis of the front end of the tool or to the axis of the drill bit, which in the drawings is indicated by the reference A.

The front end 12 comprises a fixed part and a rotary part rotating about the axis A. The rotating part comprises an SDS-type mechanism 14 for push-fitting the drill bit, which mechanism will not be described in detail as it forms part of the general knowledge of a person skilled in the art in this field. For an understanding of the present disclosure, it should be noted that this push-fitting mechanism 14 comprise a rotary ring 16 that extends around the SDS-fixing portion 18a of the drill bit 18 and that comprises radial through-slots 20 in which there are mounted rollers 22 intended to engage in longitudinal grooves 24 in this portion 18a of the drill bit. A locking mechanism 26 allows the rollers 22 to be blocked radially in the grooves while at the same time allowing the drill bit a translational travel in the front end of the tool, which travel is notably dependent on the length of the grooves 24. The mechanism 26 is accessible to the user who can unlock the assembly in order to remove the drill bit or replace same.

According to the present disclosure, the rotating part of the front end of the tool 10 further comprises an extension connection mechanism 28 for removable attachment of an extension referred to in the drawings by the reference 30.

This extension 30 is tubular and has an elongate overall shape. It is configured to extend along and around the drill bit 18, beyond its drilling tip 18c. The extension 30 comprises two opposite longitudinal ends including:
- a first longitudinal end 30a configured to be connected removably to the front end of the tool, and in particular to its rotating part, so that the extension can be driven in rotation, and
- a second longitudinal end 30b configured to bear at least one screw-driving element.

The extension connection mechanism 28 comprises a tubular body 32 intended to be secured in terms of rotation to the rotating part of the front end of the tool. The body 32 is intended to extend around a portion of the ring 16 and may be secured in terms of rotation to this ring directly. For that purpose, it comprises an end portion 32a, situated on the same side as the ring 16, and configured to fit onto the ring 16.

This end portion 32a is surmounted by an annular seal 34 that collaborates both with the ring 16 and the aforementioned locking mechanism 26 to prevent the passage of dust between these components during operation. The body 32 further comprises or defines an internal annular groove 32g for housing another annular seal 35, such as an O-ring, which extends around the part 18a of the drill bit and engages with this portion 18a when the latter is mounted in the front end of the tool.

The body 32 further comprises, on the opposite side to its portion 32a, an end portion 32b configured to engage by male/female push-fitting with the first end 30a of the extension. In the embodiment of FIGS. 1 to 5, this portion 32b is female and accommodates the male end 30a of the extension. However, the reverse is conceivable, as visible in the alternative form of embodiment in FIG. 6, in which the first end of the extension is female and accepts a male portion of the front end of the tool.

The extension 30 is intended to be set in rotation by the rotating part of the front end of the tool and therefore to rotate as one with this rotating part. This inability to rotate independently of one another can be obtained in a simple way by collaboration of shapes, the male-female push-fitting being for example performed by portions with polygonal cross sections, as in the example depicted.

Figure 3:
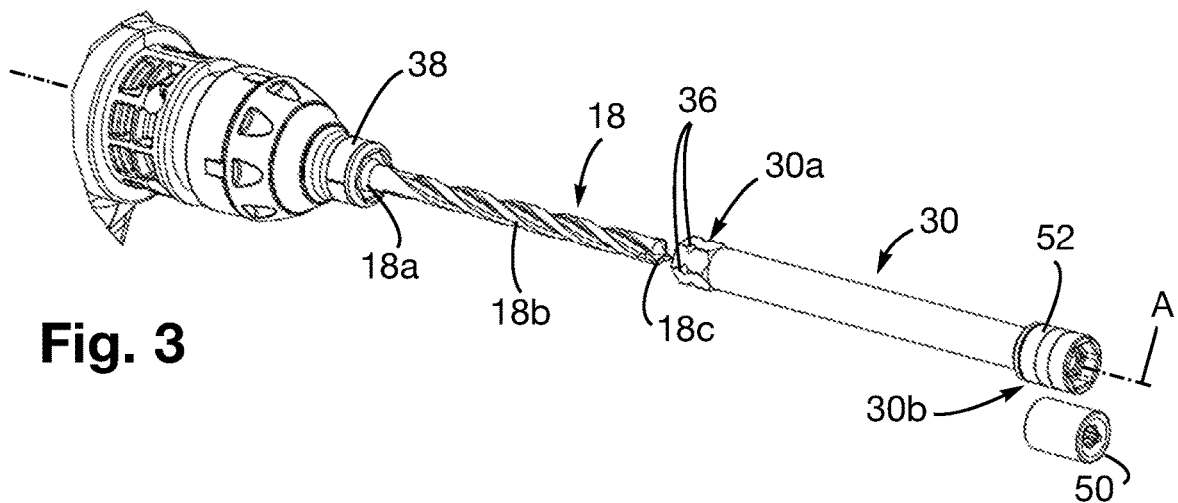
FIG. 3 is a schematic perspective view of the tool of FIG. 3, the extension having been removed from the front end of the tool.
Figure 4:
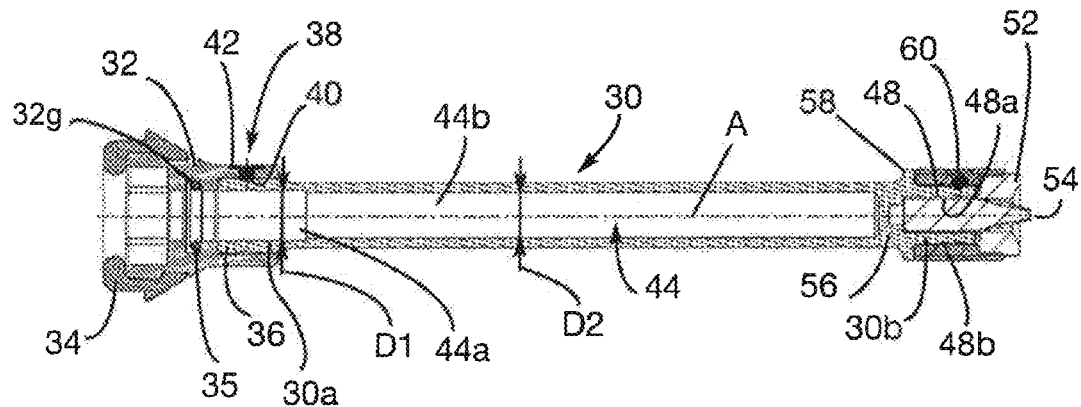
FIG. 4 is a schematic view in axial section of part of the front end and of the extension of the tool of FIG. 1.
Figure 5:
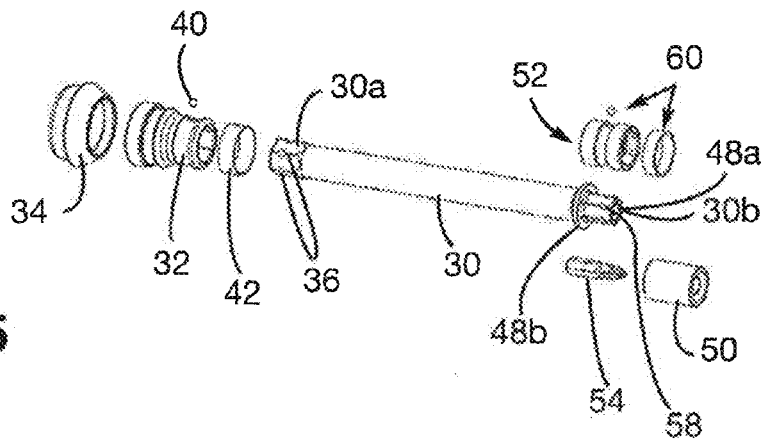
FIG. 5 is a schematic and exploded perspective view of the elements of FIG. 4.
Figure 6:
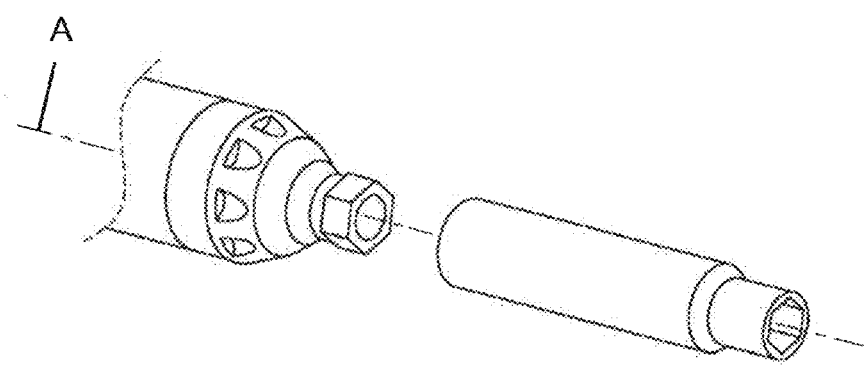
FIG. 6 is a schematic and perspective view of an alternative form of embodiment of a drilling tool equipped with an extension according to the present disclosure, the drilling tool being depicted in part and the extension being removed from the front end of the tool.

The inside of the portion 32b of the body thus in cross section has a polygonal and, more precisely, hexagonal, shape that complements the cross-sectional shape of the end 30a of the extension. The end 30a of the extension thus comprises planar exterior faces uniformly distributed on its circumference and connected one to the next by longitudinal edge corners 30b. The end 30a is, for example, of the SW13 type. As can be seen in FIGS. 3 and 5, each edge corner 30b is interrupted by a localized recess 36. The recesses 36 are situated on the one same circumference centered on the longitudinal axis of the extension, which coincides with the axis A of the drill bit and of the front end, and form sectors of an external peripheral annular groove.

The recesses 36 are intended to collaborate with a ball retention system 38 borne by the body 32 of the extension connection mechanism 28. The ball retention system 38 comprises at least one ball 40 engaged in a radial hole in the portion 32b of the body and held in this hole by way of a split ring 42 that surrounds the portion 32b, passing over the ball. The ball 40 is prevented from escaping radially outward by this ring, and radially inward by the shape or dimensions of the hole, the radially internal opening of which may for example be of a diameter smaller than the diameter of the ball. The ball 40 is urged radially inward by the ring 42 and by default adopts a position in which it partially projects radially into the internal passage of the portion 32a into which the end 30a of the extension is push-fitted. When the extension is mounted in the front end, the ball 40 is therefore engaged in a recess 36 of the extension, allowing the extension to be retained axially in relation to the front end. A manual force to extract the extension can be applied by the user to overcome the resistance of the ball and pull the extension off the tool, in axial translation.

The extension 30 comprises or defines an internal longitudinal bore 44 to accept a drill bit, when such a drill bit is mounted in the front end of the tool. The dimensions of this bore 44 are therefore notably dependent on those of the drill bit. In the example depicted, the bore 44 comprises two cylindrical portions 44a and 44b. The portion 44a, situated on the front-end side of the tool, has a diameter D1 so that it surrounds, with a small radial clearance, the portion 18b of the drill bit, which is of standard diameter as mentioned in the foregoing. The portion 44b, situated on the opposite side, has a diameter D2, where D2 is equal to or less than D1, so as to surround with clearance the portion 18a of the drill bit.

The example depicted is particularly well suited to a drill bit of which the diameter of its portion 18a is at most equal to the diameter of its portion 18b (in which case the diameters of the portions 44a and 44b are identical). If the diameter of the portion 18a of the drill bit were greater than the diameter of its portion 18b, the diameter of the portion 44b would be greater and the alternative form of embodiment of FIG. 6 would be adopted because its extension is able to accommodate a drill bit of larger diameter.

Figure 2:
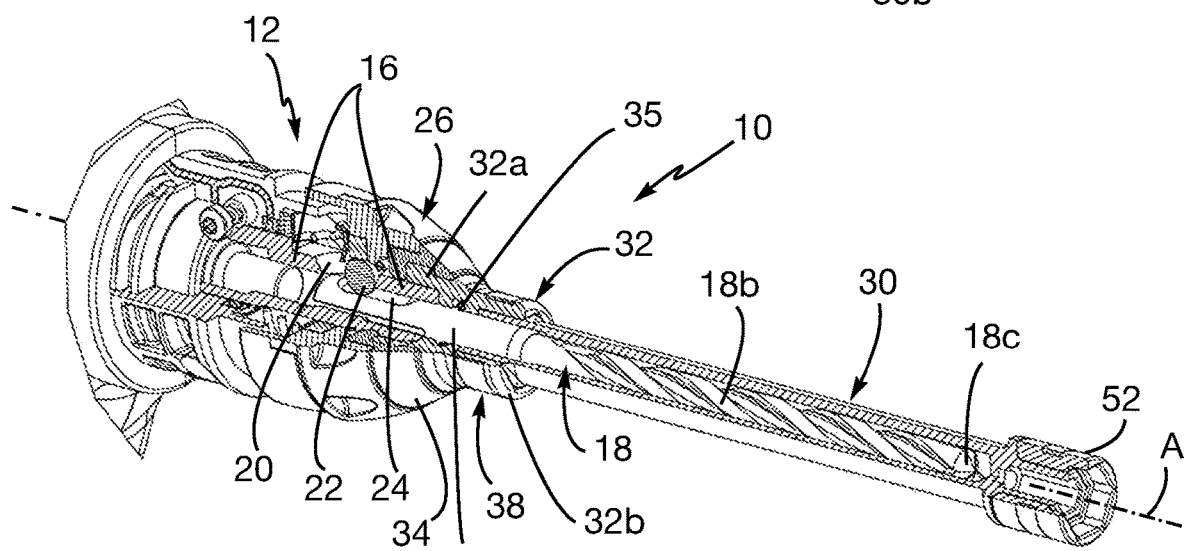
FIG. 2 is a schematic perspective and sectioned view of the tool of FIG. 1.

The length of the portion 44a can be predetermined. The length of the portion 44b is also predetermined, so as to maintain an axial clearance between the tip 18c of the drill bit and the end 30b of the extension (FIG. 2). The length of the portion 44b is therefore greater than the longest length of a portion 18a of a drill bit of diameter D2. An additional margin on this clearance may be used in order to give the possibility for translational movement of the drill bit inside the extension, particularly when a screw-driving operation is being performed while the tool is in hammer drill mode. The hammer action is not, however, needed during screw driving and therefore the drilling mode without hammer action will be favored. In operation, the extension and the drill bit are driven in rotation by the rotating part of the front end of the tool.

The end 30b of the extension 30 is configured to accommodate by male-female push-fitting, various types of end piece and coupling. It comprises a tubular wall 48 of polygonal, and more exactly hexagonal, cross section. This wall 48 comprises an annular row of flat external faces 48a and an annular row of flat internal faces 48b. Thus, a first element can be mounted on the wall 48 and engage through complementing shapes with the faces 48a, and a second element can be mounted in the wall 48 and engage, through complementing shapes, with the faces 48b. The complementing shapes allow these elements to be secured against rotation with respect to the extension.

An end-stop socket 50 or screw-driving socket 52 may for example be mounted on the wall 48 and comprise a female hexagonal portion (for example SW13) that complements the faces 48a. The end-stop socket 50 is intended to bear against a wall to limit the depth to which a fastener, such as a screw, is screwed into this wall. The screw-driving socket 52 comprises, for example, a hexagon-socket female end portion for driving a hexagon-head screw.

A screw-driving bit 54 may for example be mounted in the wall. This bit comprises a male (for example SW10) hexagonal portion complementing the faces 48b, and a screw-driving portion of flat-blade or cruciform or some other type. The bit 54 can be used in combination with the socket 50.

The insertion of the bit 54 into the wall 48 may be limited by a transverse wall 56 that closes the internal bore 44 of the extension, near its end 30b. Such closure is advantageous insofar as it makes it possible to improve the torsional strength of the extension. The axial position of the socket 50 and 52 on the wall 48 can be defined by the socket pressing against an external annular flange 58 situated on the end 30b.

In the example depicted, the faces 48b of the wall are separated from one another by edge corners each comprising a localized recess 58. The recesses 58 are situated on the one same circumference centered on the longitudinal axis of the extension and form sectors of an external peripheral annular groove.

The recesses 58 are intended to engage with a ball retention system 60 borne by the socket 52 and similar to the ball retention system 38 described in the foregoing. This system 60 is intended to ensure axial retention of the socket 52 on the wall 48 of the extension.

Figure 7:
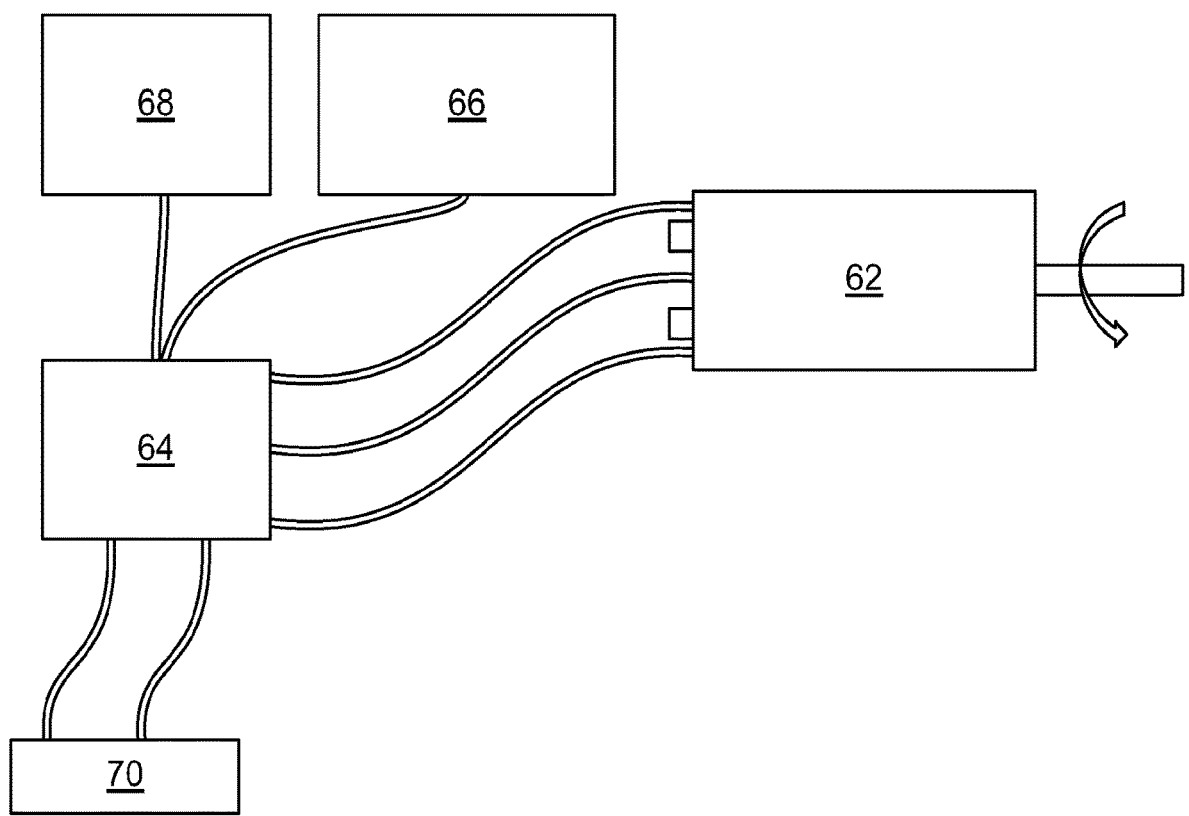
FIG. 7 very schematically depicts an electronic circuit for the control of the tool.

The tool 10 is advantageously able to operate at two, drilling/screw-driving speeds which are respectively high speed and low speed. For that, the tool 10 is also equipped with a speed selector 66 (FIG. 7). This selector 66 is situated on the casing of the tool and is accessible to the user. It may take the form of a switch that the user can move translationally between two positions, a first position for selecting the high-torque low drilling/screw-driving speed in which position an arrow on the knob points for example toward a first picture provided on the casing and depicting for example a tortoise, and a second position for selecting the low torque and high speed, in which position the arrow on the knob points toward another drawing provided on the casing and representing for example a hare.

For that, the tool preferably comprises a brushless motor 62 electronically controlled and, through the speed selector, making it possible to choose a torque and a speed that are suited to the desired function.

FIG. 7 depicts an electronic control circuit for controlling the tool. This circuit comprises the motor 62 that drives the rotating part of the front end 12 of the tool. The motor 62 is connected by a microcontroller 64 to the selector 66 and to the trigger 68 for operating the tool. The microcontroller 64 is also connected to a mode selector 70 for selecting a mode with or without hammer action. The microcontroller 64 controls the motor 62 according to instructions received from the trigger 68 and from the torque/speed selector 66.

In one particular exemplary embodiment, the selector 66 is provided with a magnet that is detected by two hall-effect sensors mounted on the electronic control circuit. Detection activates one or other of the modes of use: a normal mode with a maximum rotational speed of 800 revolutions/minute and a maximum torque of 7 N.m for hammer drilling and high speed, and a mode with a speed reduced to 300 revolutions/minute and a maximum torque of 15 N.m for low-speed high-torque screw-driving and for hammer drilling with a lower impact force. Activation of a mode makes it possible to define the maximum rotational speed of the tool. The trigger 68 of the tool because of its progressive action makes it possible to achieve any rotational speed within the range thus defined, without the torque varying. The hall-effect sensors detect at each moment the position of the rotor of the brushless motor. The phases of the stator windings can thus be switched in the appropriate sequence.

The electronic circuit thus makes it possible to control the rotational speed of the motor very precisely, the angular position (for example the number of turns of screwing) and the tightening torque.

The speed and angular position are perfectly determined by the hall-effect sensors that detect the position of the magnets of the rotor of the motor. The tightening torque is deduced/calculated from the measurement of the current injected into the various phases of the stator of the motor. This is because current and torque are directly proportional.

In another alternative form of embodiment that has not been depicted, a screw-driving element could be incorporated directly into the extension. The screw-driving element would then not be added on to the extension as in the aforementioned examples, but formed of one piece with this extension.

In one specific embodiment of the present disclosure, the extension has a length of the order of 200 mm and is made of metal.

The invention claimed is:

1. An assembly configured to operate in a first drilling mode with hammer action and in a second drilling mode without hammer action, said assembly comprising:
   a tubular extension including a first longitudinal end and a second longitudinal end, the first longitudinal end having a polygonal shape in cross section; and
   a drilling tool having a front end including:
      a rotating part including a push-fitting configured to removably receive and drive a drill bit, the rotating part including an extension connection mechanism including a tubular body configured to extend around part of the drill bit when the drill bit is received in the rotating part, and around the first longitudinal end of the tubular extension when the tubular extension is received in the extension connection mechanism,
      the tubular body having inner walls that correspond to the polygonal shape of the first longitudinal end of the tubular extension, the extension connection mechanism engageable with the first longitudinal end of the tubular extension such that the tubular extension is configured to extend along and around the drill bit when the drill bit is received in the rotating part and the tubular extension is received in the extension connection mechanism, such that the second longitudinal end of the tubular extension is configured to engage a screw-driving element, and such that the assembly is configured to cause a screw-driving operation when the drill bit is received in the push-fitting,
      the tubular body defining an internal annular groove,
      the extension connection mechanism including an O-ring seal in the internal annular groove and configured to engage the drill bit when the drill bit is received in the rotating part,
      the tubular body including a first end portion and a second end portion connected to the first end portion,
      the extension connection mechanism including a rotary ring, wherein the first end portion of the tubular body extends around a portion of the rotary ring, and is configured to fit onto that portion of the rotary ring, and securable to that portion of the rotary ring,
      a locking mechanism configured to unlock the assembly to enable removal of the drill bit,
      an annular seal that surmounts the first end portion of the tubular body, and
      a split ring positioned on the second end portion of the tubular body,
      wherein the first end portion of the tubular body is between part of the rotary ring and part of the annular seal, and
      wherein the rotating part and the extension connection mechanism are configured to not transmit hammer action to the tubular extension.

2. The assembly of claim 1, wherein the push-fitting is a male-female push-fitting.

3. The assembly of claim 1, wherein the extension connection mechanism includes a biased retention ball movable into a recess defined by the first longitudinal end of the tubular extension.

4. The assembly of claim 1, wherein the extension connection mechanism includes an inwardly biased retention ball movable into a recess defined by the first longitudinal end of the tubular extension.

5. The assembly of claim 1, wherein the extension connection mechanism includes an inwardly biased retention ball movable into any one of a plurality of recesses defined by the first longitudinal end of the tubular extension.

6. The assembly of claim 1, which includes a mode selector operable to enable user selection of the first drilling mode and the second drilling mode, and a speed selector operable to enable user selection of a first speed for hammer drilling with a high impact force and fast screw driving, and a second lower speed for slow high-torque screw driving and hammer drilling with a lower impact force.

7. The assembly of claim 6, which includes a brushless motor operably connected to the rotating part to drive rotation of the rotating part, the brushless motor connected by a microcontroller to the mode selector, the speed selector, and to a trigger.

8. The assembly of claim 1, wherein the tubular extension defines a longitudinal internal bore that is open at the first longitudinal end and that is of a length and a diameter such that the tubular extension is removably mountable to the drilling tool over the drill bit when the drill bit is received in the rotating part.

9. The assembly of claim 8, wherein the longitudinal internal bore includes at least two cylindrical portions of different diameters, including a first portion of larger diameter than a second diameter, and wherein the first portion is at the first longitudinal end.

10. The assembly of claim 8, wherein the second longitudinal end has a polygonal shape in cross section.

11. The assembly of claim 8, wherein the second longitudinal end is configured to receive an element affixed by a male push-fitting or a female push-fitting.

12. The assembly of claim 11, wherein the second longitudinal end is configured to receive two elements affixed by the male push-fitting and the female push-fitting, respectively.

\* \* \* \* \*